May 3 1966  C. H. HAMILTON  3,249,414
APPARATUS AND METHOD FOR MAKING STRAIGHT PRECISION GLASS
BARRELS OR BODIES FOR SYRINGES
Filed Nov. 19, 1962  3 Sheets-Sheet 1
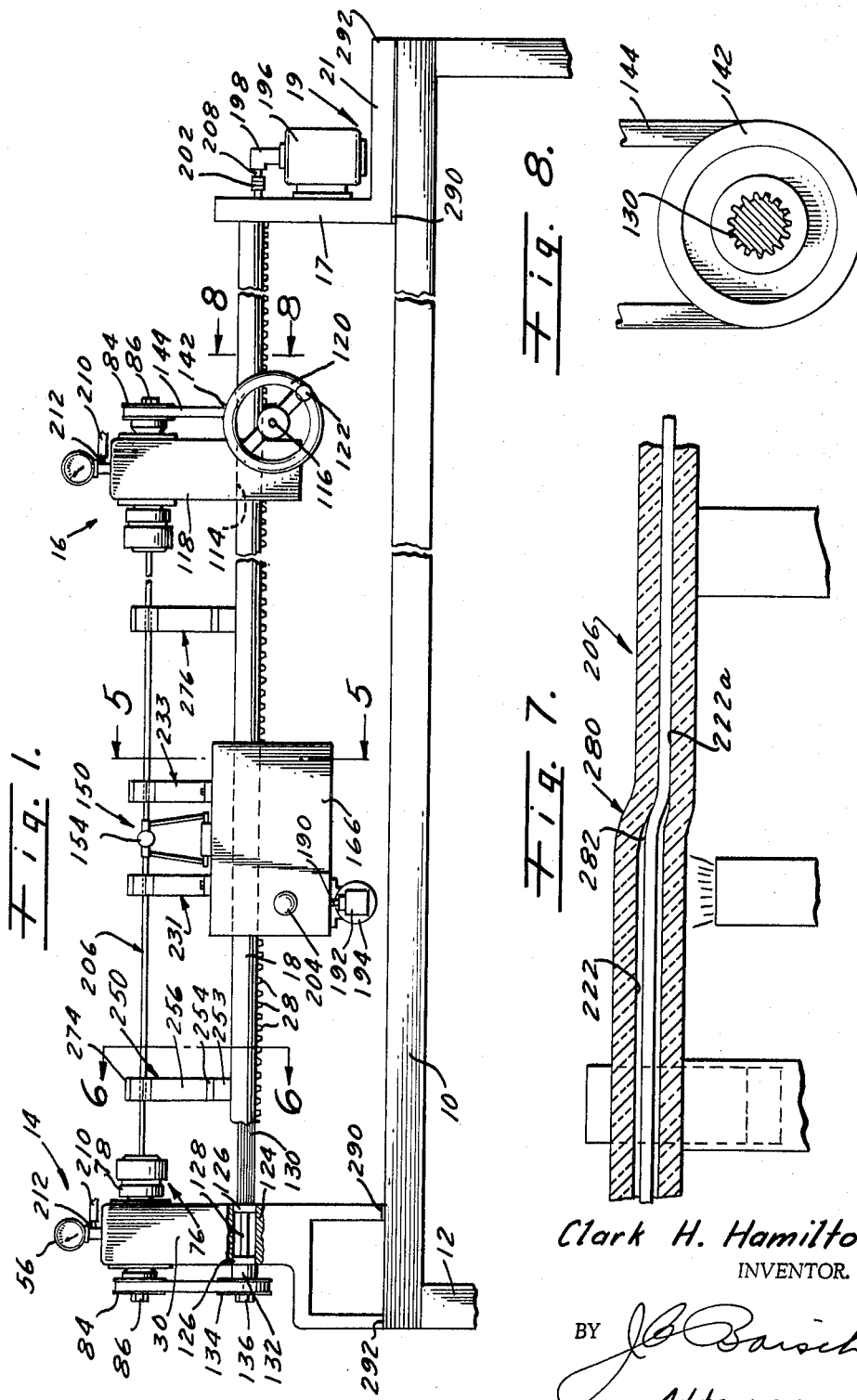
Clark H. Hamilton,
INVENTOR.
BY 
Attorney

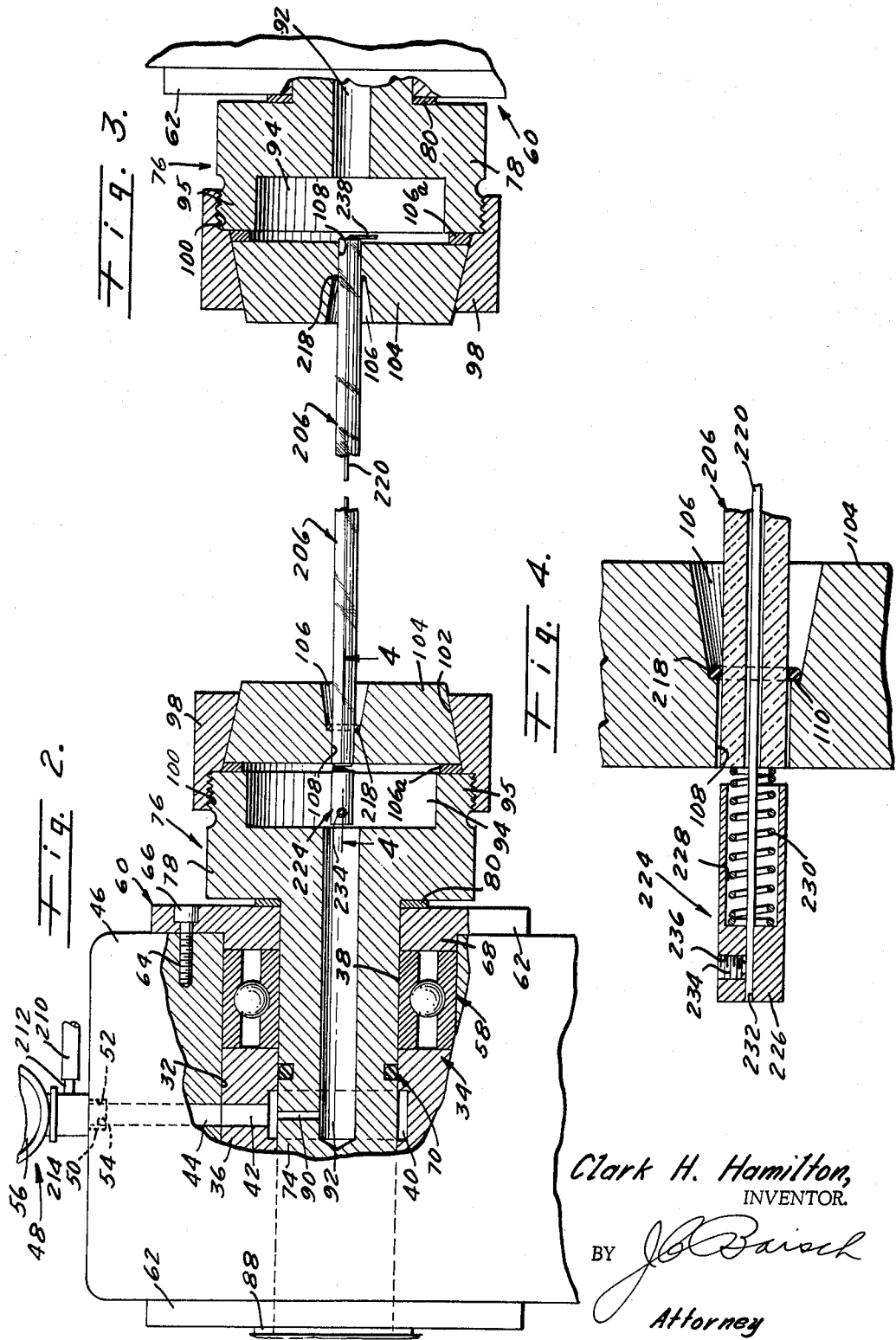

May 3 1966 C. H. HAMILTON 3,249,414
APPARATUS AND METHOD FOR MAKING STRAIGHT PRECISION GLASS
BARRELS OR BODIES FOR SYRINGES
Filed Nov. 19, 1962 3 Sheets-Sheet 3
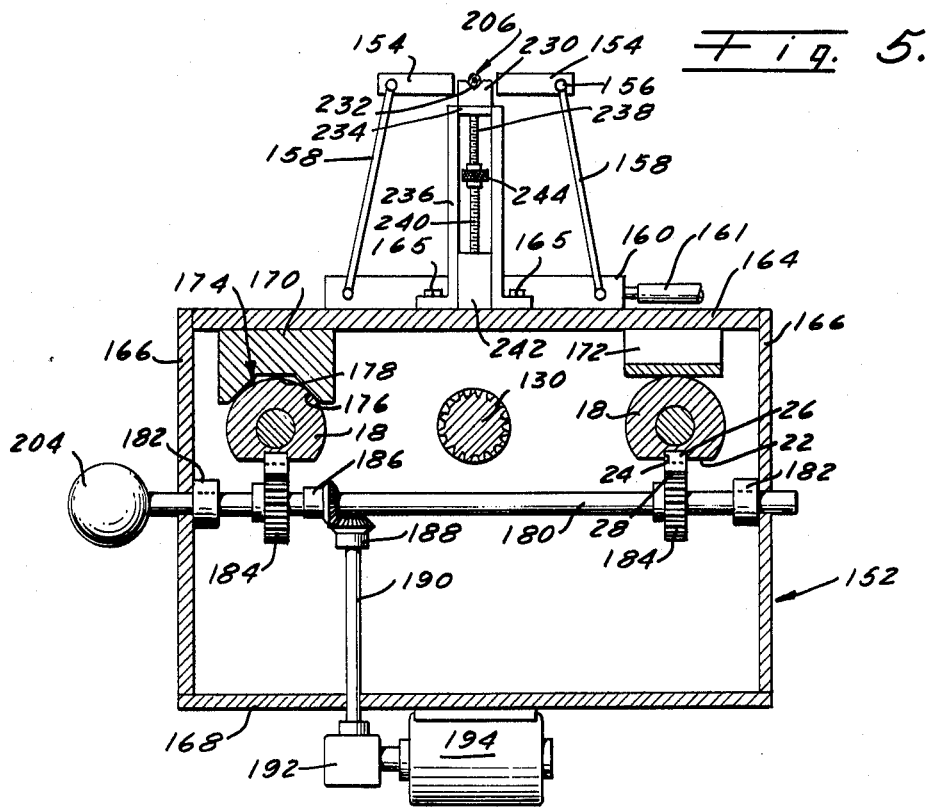
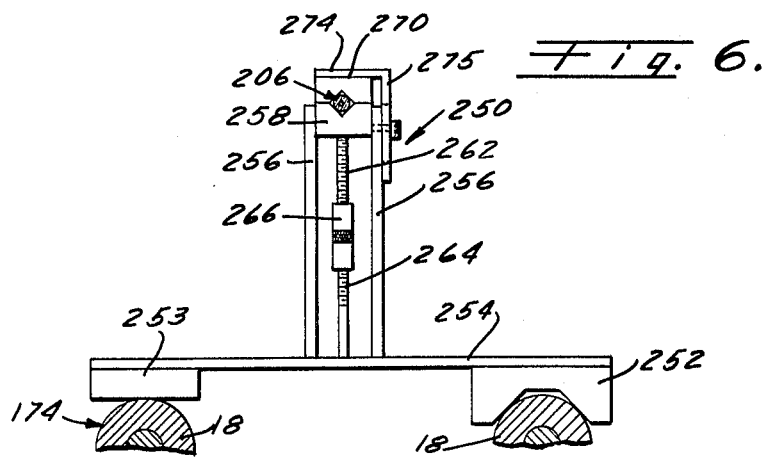
Clark H. Hamilton,
INVENTOR.
BY
Attorney

United States Patent Office 3,249,414
Patented May 3, 1966

3,249,414
APPARATUS AND METHOD FOR MAKING STRAIGHT PRECISION GLASS BARRELS OR BODIES FOR SYRINGES
Clark H. Hamilton, P.O. Box 307, Whittier, Calif.
Filed Nov. 19, 1962, Ser. No. 238,459
16 Claims. (Cl. 65—109)

This invention relates generally to glass working equipment or apparatus and method and relates more particularly to means and method for making straight precision bore glass barrels or bodies for syringes used for scientific purposes.

While the invention has particular utility in connection with equipment and method for producing straight precision bore glass syringe barrels or bodies with bores that are extremely accurate and straight to provide the maximum degree of accuracy for scientific work, and is shown and described in such connection, it is to be understood that its utility is not confined thereto.

As is well known in the art of manufacturing glass syringe barrels for syringes used for scientific purposes, it is a serious problem to provide such barrels with plunger bores having the extreme accuracy and precision required in such equipment.

It is therefore an object of the present invention to provide means and method for producing glass barrels for scientific syringes having bores therethrough that have the required straightness, precision and accuracy throughout the length thereof, required in scientific work.

It is another object of the invention to provide a precision bore lathe which will produce such straight precision bore glass syringe bodies or barrels.

It is still another object of the invention to provide apparatus of this character that will shrink such glass barrels or bodies to a precise inside or bore diameter.

It is a further object of the invention to provide apparatus of this character that will produce such barrels or bodies wherein the plunger bores therethrough are well centered.

A still further object of the invention is to provide apparatus of this character wherein the mandrel is supported.

Another object of the invention is to provide apparatus of this character wherein the mandrel is maintained under tension and provides part of the support for the glass tubing being operated upon by said apparatus.

Still another object of the invention is to provide apparatus of this character wherein long looping bends are taken out of the tubing.

A further object of the invention is to provide apparatus of this character wherein the glass tubing may be accurately and rapidly centered in the head and tailstock.

A still further object of the invention is to provide apparatus of this character adapted to accommodate outside tubing diameter variations of a given size lot.

Another object of the invention is to provide apparatus of this character providing a general pressure reduction in the bore throughout the entire shrink of the tube.

Still another object of the invention is to provide apparatus of this character wherein vacuum is applied to both ends of the tube.

A further object of the invention is to provide apparatus of this character wherein the mandrel is free of oxidation.

A still further object of the invention is to provide a lathe of this character having means for removing the sag in the lathe bed.

It is another object of the invention to provide apparatus of this character that is so free of vibrations as to have no effect on the production of highly accurate straight precision bore glass barrel or bodies for syringes.

Still another object of the invention is to provide apparatus of this character wherein rapid, easy selection of optimum operation conditions is possible.

A further object of the invention is to provide apparatus of this character which greatly reduces the cost of precision bore glass barrel or body blanks.

A still further object of the invention is to provide apparatus of this character which produces precision bore glass barrel or body blanks which, because of the great accuracy and precision thereof, the production per man has been increased from two to four times.

The characteristics and advantages of the invention are further sufficiently referred to in connection with the following detailed description of the accompanying drawings which represent certain embodiments. After considering these examples, skilled persons will understand that variations may be made without departing from the principles disclosed and I contemplate the use of any structures, arrangements, modes of operation, and/or steps of the method that are properly within the scope of the appended claims.

Referring to the drawings, which are for illustrative purposes only:

FIG. 1 is a side elevational schematic view of apparatus embodying the present invention;

FIG. 2 is an enlarged side view of the head-stock with a portion broken away to show the construction and arrangement of certain parts;

FIG. 3 is a similar view of the tail-stock;

FIG. 4 is an enlarged sectional view taken on line 4—4 of FIG. 2 showing the collet of the head-stock with one end of the glass tube in position therein and the mandrel tensioning means;

FIG. 5 is a sectional view taken on line 5—5 of FIG. 1;

FIG. 6 is a sectional view taken on line 6—6 of FIG. 1;

FIG. 7 is an enlarged sectional view showing the glass rod and mandrel at the location of the application of heat; and FIG. 8 is a sectional view taken on line 8—8 of FIG. 1.

Referring more particularly to the drawings, there is shown the upper part of a lathe embodying the present invention, said lathe including a base 10 supported on legs 12, both base and legs being of well known character.

There is a head-stock, indicated generally at 14, positioned at one end of the base and secured thereto, and adjacent the other end of said base and secured thereto is a tail-stock, indicated generally at 16.

Ways 18 are provided, there being a pair of ways extending longitudinally between the head-stock and tail-stock, said ways being arranged horizontally and spaced apart laterally in substantially the same horizontal plane. The ways may be of any suitable well known character, their ends adjacent the tail-stock, being secured thereto in the usual well known manner. The other ends of said ways are secured in any well known manner to the upstanding part 17 of a ways supporting bracket, indicated generally at 19, the horizontal part 21 of said bracket being secured to the bed or base 10 by any suitable well known means such as screws, for example.

As shown, the ways 18 are round in cross section except for the under sides which are flat, as at 22, there being a longitudinally extending groove 24 in the under side of each way in which a rack 26 is secured by any suitable means, such as, for example, brasing, welding, screws, or the like. The racks have a plurality of depending, longitudinally spaced teeth 28 depending below the plane of the flat under sides 22 of said racks.

The head-stock 14 comprises a hollow housing 30 upstanding from the base 10 and secured thereto by any suitable well known means such as, for example, screws, not shown.

Adjacent the upper end of the casing 30 is an opening or bore 32 extending longitudinally relative to the lathe and in which is bearing means, included generally at 34. Bearing means 34 includes a bushing 36 positioned intermediate the ends of the opening or bore 32, said bushing being securely disposed within the bore and held against rotation therein by any suitable means such as a press fit, for example, or by screw means. Bushing 36 has an axial bore 38 therethrough and there is an annular, internal groove 40 in said bushing from which extends to the outer surface a radial bore 42 which registers with the inner end of a passage 44 in the upper end portion 46 of the head-stock. Attached to said portion 46 of the head-stock is a vacuum gauge 48 of any suitable well known character and has an externally threaded nipple 50 screwed into an internally threaded counter bore 52 in the portion 46 of the head-stock, there being a passage 54 in said nipple connecting with the passage 44 and extending into the gauge 48 so that pressure or vacuum within the passage 44 will be registered on the dial 56 of said guage.

At each side of the bushing 36 is a roller bearing assembly 58 held in position by a bearing securing means, indicated generally at 60. Bearing securing means 60 includes a plate 62 of substantially greater diameter than the bore 32 and provided with means for attachment to the adjacent end of the head-stock. The attachment means for plate 62 comprises a plurality of suitably arranged screws 64 removably screwed into tapped openings provided therefor in the adjacent part of the head-stock. It is to be noted that there are openings provided in said plate 62 which register with said tapped openings for screws 64, and the heads 66 of said screws are disposed in counter-bores provided therefor in the plate 62.

An annular boss 68, integral with plate 62 extends inwardly into the bore 32 for retaining engagement with the adjacent end of the respective ball bearing assembly 58. In order to provide a seal for the spindle it is peripherally recessed for reception of an annular seal 70 of any suitable character such as, for example, an O-ring.

Rotatably received in the bearings 58 and bushing 36 is the shaft 74 of an arbor or spindle, indicated generally at 76, which has an enlarged head 78. There is a spacer 80 on shaft 74 between the plate 62 and head 78, while at the outer or free end of shaft or spindle, said shaft having a reduced diameter portion, not shown, extending axially outwardly and externally threaded adjacent its outer end. A pulley 84 is disposed on this reduced diameter shaft part and secured thereon by nut means 86. A spacer 88 is disposed between the inner side of the pulley 84 and the outer side of the adjacent plate 62.

Shaft 74 has a radial bore 90 having its outer end communicating with the groove 40 of the bushing and connecting at its inner end with a bore 92 in shaft 74 extending axially toward the head end of said shaft and communicating at the latter end with a recess 94 extending inwardly from the free end of said head.

The free end portion 95 of head 78 is externally threaded for threaded reception of a collet retaining nut 98 having an internally threaded recess 100 at one end, the internal threads of said recess being disposed on the externally threaded portion of said head. From recess 100 the nut 98 has an outwardly tapered bore 102, said bore being of smaller diameter at its outer end than at its inner end and being adapted to wedgedly receive a collet 104 of frusto-conical shape, there being an annular seal 106a between a peripheral edge portion of the inner end of said collet and the adjacent annular peripheral end of said head.

In its smaller end the collet 104 has an axial recess 106 flaring outwardly from its inner end, and there is an axial bore 108 extending from the inner end of the recess 106 to the larger end of said collet. Bore 108 is of smaller diameter than the inner end of the recess 106 so that there is an annular shoulder 110 at the inner end of said recess 106 and about the adjacent end of said bore 108.

The upper part of the tail-stock 16 is constructed similarly to the upper part of the head-stock and has the various parts thereof described above.

Tail-stock 16 has a pair of openings extending longitudinally thereof relative to the lathe in which the ways are slidably received in the usual, well known manner, said tail-stock thus being supported by the ways. There is the usual means for adjustably moving the tail-stock on the ways, said means comprising pinions or gears, not shown, secured on a shaft 116 rotatably carried in the usual manner by the housing 118 of said tail-stock.

The gears or pinions are positioned on said shaft 116 so as to mesh with the teeth of the respective racks 26 so that rotation of said shaft effects rotation of said gears and hence movement of the tail-stock longitudinally on said ways. In order to facilitate rotation of shaft 116 a wheel 120 is secured to the front end of said shaft and there is a cranking handle 122 on said wheel, off-set from said shaft 116.

Housing 30 has a sleeve 124 secured therein having internal grooves in the ends thereof in which is operably disposed respective roller bearings 126. A reduced diameter end portion 128 of a splined shaft 130 is disposed in said bearings 126 and extends axially outwardly of the outer side or end of the housing 30. A spacer 132 is provided on said shaft portion 128 at the outer side of the adjacent bearing and at the outer end of spacer 132 is a pulley 134 in operable alignment with the pulley 84 at the top of the head-stock 14, there being a nut 136 received on an externally threaded outer end portion, not shown, of the shaft portion 128 for securing the pulley 134 thereon. Pulleys 84 and 134 are operably connected together by a belt 138, said pulley 134 being the drive pulley and pulley 84 being the driven pulley.

Housing 118 of the tail-stock 16 also carries a drive pulley, indicated at 142, which is rotatably mounted at the outer end of the tail-stock housing 118. This pulley, however, has an axial splined opening therethrough in which is slidably received the splined shaft 130 so that pulley 142 is slidable on shaft 130 but is rotatably driven thereby. This arrangement is well known and details of its construction are not needed. The purpose of this arrangement is to provide for adjusting the position of the tail-stock relative to the head-stock to accommodate tubing of various lengths. Drive pulley 142 drives the pulley 84 of the tail-stock through a belt 144.

Means for heating the glass tubing in accordance with the present invention includes heating means, indicated generally at 150, and is carried longitudinally of the lathe by carriage, indicated generally at 152. Any suitable heating element or means may be used, as shown, said heating means comprises a gas jet or flame, the gas or combination of gases being of any suitable type providing a clean flame of sufficiently high temperature. For example, natural gas and oxygen may be used.

There are a pair of gas discharge nozzles 154 having their open discharge ends facing each other and spaced apart, as best shown in FIG. 5. Nozzles 154 have oppositely extending tubular elements 156 connected to the upper ends of respective conduits 158, the lower ends of said conduits being connected to a hollow manifold 160, connected by any suitable means, such as conduit 161, to a source of fuel, not shown, such as gas or a combination of gases. The means connecting the source of fuel with the manifold should be flexible so as not to interfere with the movement of the carriage 152 as it travels along the ways, as will be described more particularly hereinafter.

Manifold 160 is secured to the top plate or wall 164 of the carriage 152 by any suitable means such as screws or the like, not shown. The carriage also is provided with side walls 166 and a bottom wall 168, said walls being secured together by screws, brazing, welding or other suitable means. Carriage 152 is open at the ends so as to receive the ways 18 therethrough.

The carriage is provided with bearing blocks 170 and 172 which extend longitudinally therein and are attached to the underside of the top wall 164 by any suitable means such as screws or the like. Block 170 has a groove 174 extending longitudinally thereof in the under side, the sides 176 of said groove flare outwardly from the top 178 thereof. Sides 176 rest upon one of the ways 18 in tangential relationship with the top 178 spaced upwardly of the top of said way, an arrangement which keeps the carriage in proper position on the ways. The other bearing block 172, also extends longitudinally of the carriage and is secured to the under side of the top wall 164. The under surface of block 172 is horizontal and rests on the top of the other way 18 in tangential relationship therewith. With the above arrangement there is a minimum of contact surface or area between the bearing blocks and the ways thereby holding friction to a minimum.

The bearing blocks 170 and 172 may be of any suitable material but it has been found that a plastic such as nylon provides very satisfactory material for the purpose.

In order to effect movement of the carriage longitudinally of the ways a shaft 180 is provided and extends transversely of the carriage being disposed in openings provided therefor in the side walls 166 and bearings 182 secured to said side walls.

Attached to shaft 180 are a pair of gears 184, the teeth of which normally have meshing relationship with the teeth 128 of the respective racks 26. Shaft 180 also has a bevel gear 186 secured thereto and is normally in mesh with a bevel gear 188 secured to the adjacent end of a vertical drive shaft 190 driven, through gears in a gear box 192, by a suitable source of power such as an electric motor 194 secured to the under side of the bottom wall 168.

The splined shaft 130 is also driven by a suitable source of power such as, for example, an electric motor 196 attached to the upright member 17 of the bracket 19. Motor 196 has a gear box 198 at the upper end from which a shaft 208 extends at right angles to the axis of the motor 196, and shaft 200 is connected to the adjacent end of the splined shaft 130 by means of a flexible coupling 202.

In order to make straight precision bore glass tubing for syringe barrels and the like, the drive units of both the head- and tail-stock and the fire carriage 152 must be vibrationless. The vibrations and their subsequent harmonics in the long tube of glass result in sharp bends and in order to eliminate this a direct current drive is used, and the particular type of motors 194 and 196 used are Bodine shunt wound motors which are well known in the electric motor art. Rheostats, not shown, are used to control the speed of said motors and hence the parts driven thereby, although any other suitable speed control means may be used.

It is to be noted that the shaft 180 is arranged so that it may be longitudinally pulled forwardly or outwardly to disengage the bevel gear 186 from the gear 188 to thereby stop longitudinal movement of the carriage on the ways and permit manual adjustment of said carriage on said ways. The shaft may be moved inwardly from the outer position to engage said gear 186 with gear 188 to cause the carriage to travel or move on said ways. A knob 204 is provided at the outer end of shaft 180 to facilitate longitudinal actuation of the shaft.

A glass tube to be operated upon is indicated generally at 206 and extends between the head-stock and the tail-stock. The ends of the tube are disposed in the bores 180 of the collets 104, extending through the recesses 106 thereof.

Suction or vacuum is applied to both ends of the tube 206 by means of conduits 210 connected with a source of suction or vacuum, said conduits also being connected to nipples 212 extending laterally from stems 214 of gauges 48, so as to provide vacuum connections with the passages or bores 44 of said head- and tail-stocks with which said gauges are connected.

In order to hold this suction or vacuum and prevent leakage about the ends of the glass tube 206 in the collets a seal 218 is provided for each end of said tube 206 which sealingly engage the tube and sealingly abut or engage the shoulders 110 at the inner end of the recesses 106. Thus the tubing is held in place in the head- and tail-stock and permits accurate and rapid centering of the tubing in the collets of said head- and tail-stock. It is to be noted that the bores 108 are a little larger than the outside diameter of the largest diameter tubing the particular collet is adapted to receive.

The inside diameter of the glass tube 206 must be as exactly sized as possible and in order to secure this result a mandrel, wire or rod 220 is disposed under tension within the bore or inside passage of said tubing, the outside diameter of said mandrel being smaller than the inside diameter of said tubing before it has been shrunk, the portion of said mandrel before the tubing has been shrunk being indicated at 222.

Means for putting the mandrel under tension is provided. As shown, said means, indicated generally at 224, comprises a spring retainer 226 having a bore 228 extending longitudinally from one end, the open end facing one end of the tubing 206, as best shown in FIG. 4. Within the bore 228 is a coil spring 230 of greater length than the bore 228 so that the outer end of said spring extends outwardly of said bore and engages the adjacent end of the tubing 206 when the tensioning means is operative.

The adjacent end of the mandrel 220 extends into an axial bore 232 in said spring retainer 226 provided therefor, said mandrel end portion being secured in bore 232 by a set screw 234 screwed into a radial tapped bore 236 provided therefor in said retainer 226. It is to be noted that the opposite end of the mandrel is bent over at approximately right angles, as indicated at 238, to securely hold said opposite end against inward movement.

Prior to positioning the tubing 206 in the collets of the lathe, the mandrel is inserted in the tubing. The end 238 is bent over and the spring retainer secured to the end opposite the bent over mandrel end 238. It is to be understood, of course, that the spring retainer end of the mandrel could be bent over at the outer end of said spring retainer. However, the spring retainer is so positioned that the inner end is spaced from the adjacent end of the tubing with the spring urging said spring retainer outwardly to place a tension on the mandrel and maintain the mandrel under tension while the tubing is being operated upon, as hereinafter described.

After the mandrel is installed under tension in the piece of tubing 206 to be operated upon, the seals 218, which are shown as O-rings, are placed on the end portions of said tubing.

Prior to installing the tubing the tail-stock is moved away from the head-stock a sufficient distance so as not to interfere with such installation. After the tail-stock has been thus moved, one end of the tubing 206, as the end having the spring retainer 234, is inserted into the recess 106 and bore 108 of the collet of the head-stock. The O-ring is positioned sufficiently close to the adjacent end of the tubing so as to sealingly engage the shoulder 110 of recess 106, the spring retainer then being operably disposed in the recess 94 of said collet. It is to be noted that the spring retainer is of sufficiently smaller outside diameter than the bore 108 of the collet so that it can be inserted into recess 106 and bore 108 ahead of the adjacent end of the tubing. The other end of the tubing is then aligned with the recess 106 and bore 108 of the collet of the tail-stock and the latter is then adjustably moved toward the head-stock so as to properly position the adjacent tubing end in its collet with the O-ring thereof sealingly seated on the shoulder 110 at the inner end of said recess 106.

The carriage 152 is then moved along the ways to its initial position adjacent the tail-stock by first pulling the knob 204 forwardly to disengage the bevel gears 186 and 188. When the carriage has been thus positioned the tubing is disposed between the nozzles 154.

Means is provided for supporting the tubing adjacent the heating zone. For one type of operation there is support means carried by the carriage ahead of and behind the heating region, said means being indicated generally at 231 and 233. These means are of the same construction so but one, means 231, will be described, said means comprising a support block 230 having a tube receiving notch 232 in the top thereof. Block 230 is carried on a support member 234 slidably disposed between vertical, laterally spaced guides 236 removably secured to the top side of the top wall 164 by any suitable means such as screws 165 or the like. There are a pair of aligned, oppositely arranged screws 238 and 240 which are operably connected to the member 234 and a fixed member 242 between the lower ends of said guides 236. Screws 238 and 240 are axially aligned with their adjacent ends spaced apart and operably disposed with an adjustment screw 244. Rotation of nut 244 will effect raising or lowering of the tubing support block 230, depending upon the direction of rotation of said screw and said block 230 is adjusted to operably support the tubing during the heating and shrinking operation.

That portion of the tubing between the support block 230 and the head-stock is also provided with support means of suitable character, said support means being indicated generally at 250 and comprises a pair of members 252 and 253 of suitable material, member 252 having an inverted V-shaped notch for reception of the respective way, while member 253 has a flat under side resting on its way, said members 252 and 253 being mounted on a horizontal bar 254. On bar 354 are a pair of vertical, laterally spaced guides 256 for a vertically slidable block having a V-shaped notch in the upper side in which the tubing rests and is supported. Block 258 has a screw 262 operably depending therefrom and a screw 264 extends upwardly from bar 254 in axial alignment with screw 262, the adjacent ends of said screws being spaced apart and disposed in a nut 266. Rotation of nut 266 raises or lowers block 258 and element 270, depending on the direction of rotation of said nut whereby the element 260 is positioned to properly support the tubing.

Tubing hold down means is also provided and comprises an element 270 with an inverted V-shaped notch in which the tubing is received. Element 270 has connecting means 272 with weight means 274, a sufficient weight being applied to properly hold that portion of the tubing between the block 230 and the head-stock, gravity supplying the tube hold down force for the element 270. Weight means 274 includes depending portion 275 having a vertical slot 275a slidably receiving a screw 275 for retaining the weight means in place. This screw may be left loose or it may be tightened.

A similar support means, indicated generally at 276, may be used between the block 230 and the tail-stock when the carriage has traveled a sufficient distance toward the head-stock to require such support. If desired the weighted top element may be omitted.

With the tubing sealingly mounted in the head- and tail-stocks and the carriage positioned adjacent the tail-stock, vacuum or suction is applied, both ends of the tubing being subjected to said vacuum. The gas is then turned on and the nozzles or burners 154 lighted, the flames therefrom being directed against the tubing disposed therebetween, said tubing being heated to a proper temperature whereat it is molten.

By having the vacuum applied to both ends of the tubing a more rapid turn around to the next piece is possible. Also this arrangement gives a lower general pressure throughout the entire shrink of a tube with the subsequent freedom from oxidation of the mandrel.

To shrink the tubing to a precise inside diameter well centered in the glass it is necessary to support the mandrel and for this purpose it has been discovered, as pointed out above, that tension is necessary. This is particularly true with smaller diameter mandrels such as, for example, 0.060 inch in diameter, and the desired results are obtained by light spring tension. This tension is such that the end of the glass may support the stress and the vacuum and the O-ring friction are sufficient to keep the glass from moving together into the melted zone. This tension on the mandrel, in addition to centering same, takes out the long looping bends found in conventionally made tubing.

For some types of work and with some types of glass the support means 231 and 233 are used without the support means 276. In other types of operations it has been found advantageous to omit the support means 233 and use the support means 276.

With either arrangement, at the heated zone or point of shrink, indicated generally at 280, where the glass is fluid, there is a bubble 282. It is to be noted that ahead of the point of shrink the diameter of the bore, as at 222, is greater than the outside diameter of the mandrel. After the tubing and mandrel have passed the heated zone the glass shrinks tightly onto the mandrel, as at 222a.

The rotation of the glass together with the mandrel tension, results in the glass straightening itself so that the camber (bend) is less han .0001 inch per inch on the inside diameter. It is to be noted that the glass to start with may have a camber as bad as .020 inch per inch.

When the mandrel is not tensioned, it will cause a looping bend at the heated zone due to its expansion, as a result of being heated in said zone. This is particularly true when the mandrel is restrained by friction or some obstruction in the unshrunk portion of the glass tubing, the mandrel being held tightly in the shrunken portion of the tubing.

The tension under which the mandrel is placed by the spring, overcomes these restrictions permitting the mandrel to be maintained straight, it being noted that the spring is at the unshrunk end of the glass tubing. The spring also straightens out any long looping bend inherent in the mandrel.

The carriage moves slowly from a position adjacent the tail-stock to a position adjacent the head-stock. The tubing is, of course, heated and shrunk as the carriage moves along.

After the tubing has been shrunk throughout the entire portion which may be subjected to the heat treatment, it is removed and the mandrel has then shrunk enough so that it will be sufficiently free in the bore to be pulled therefrom. This is due to the difference in the coefficient of expansion and contraction of the metal mandrel and the glass tubing.

The mandrel may, of course, be of any suitable metal. However, stainless steel has been found to provide highly satisfactory results.

It is to be noted that the collets of both the head-stock and tail-stock are driven by means of the splined shaft 130, which drives the pulleys 134 and 142, the latter driving the pulleys 84 of the head- and tail-stock by means of belts.

The taper in the collet recesses 106 facilitate loading the glass tubing thereinto and accommodates variations in the diameters of a given size lot of glass, which variations may be as great as 0.060 inch. Different collets, of course, are used for each major size classification of glass.

While a plurality of burners are shown and described hereinabove it is to be understood that a single burner may be used.

Another problem or factor in producing straight precision bore glass tubing is the maintenance of a true straight lathe bed. This problem is solved by warping the tops of both the head-stock and the tail-stock away from each other, thereby lifting up the sag in the bed or ways, such lifting of the said sag is effected by shimming the inside of the head-stock and the bracket 19 by means of shims 290 and screwing down the end edges 292, as shown in FIG. 1, said screws not being shown.

The invention and its attendant advantages will be readily understood from the foregoing description and it will be apparent that various changes may be made in the form, construction and arrangement of the parts of the invention without departing from the spirit and scope thereof or sacrificing its material advantages, the arrangement hereinbefore described being merely for purposes of illustration, and we do not wish to be restricted to the specific form shown or uses mentioned except as defined in the accompanying claims, wherein various portions have been separated for clarity of reading and not for emphasis.

I claim:

1. In apparatus for shrinking glass tubing and making straight, precision glass barrels:
   (A) means for rotatably supporting a length of glass tubing;
   (B) support means for disposition under tension in the bore of said tubing;
   (C) heating means for heating said tubing to a fluid state;
   (D) and means for carrying said heating means lengthwise of said tubing to progressively heat a section of said tubing to a fluid state.

2. A method for making straight, precision glass barrels for syringes and the like, comprising the steps of:
   (A) rotating a length of glass tubing with a mandrel disposed under tension in the bore thereof, the outside diameter of the mandrel being the diameter of the bore in the finished barrel;
   (B) constantly supplying vacuum to both ends of said glass tubing;
   (C) progressively heating a limited section of said tubing to a fluid condition from one end of a portion of said tubing to be shrunk to the other end of said portion while maintaining the mandrel portion in the unshrunk portion of the tubing under tension while rotating said tubing and mandrel;
   (D) and supporting said tubing ahead of the heated section and behind said heated section while permitting the tubing to straighten out with extreme precision under the influence of the tensioned mandrel and vacuum applied to the tube ahead of the heated section.

3. In a method for making straight, precision glass barrels for syringes and the like, comprising the steps of:
   (A) rotating a length of glass tubing with a mandrel disposed under tension in the bore thereof;
   (B) constantly supplying vacuum to the unshrunken end of said glass tubing;
   (C) heating a limited zone of said tubing to a fluid condition and progressively moving said zone from one end of a portion of said tubing to be shrunk to the other end of said portion while maintaining the mandrel portion in the unshrunk portion of the tubing under tension while rotating said tubing and mandrel;
   (D) and supporting said tubing ahead of the heated section and behind said heated section while permitting the tubing to straighten out with extreme precision under the influence of the tensioned mandrel and vacuum applied to the tube ahead of the heated section.

4. In a method for making straight, precision glass barrels for syringes and the like, comprising the steps of:
   (A) rotating a length of glass tubing with a mandrel disposed under tension in the bore thereof;
   (B) constantly supplying vacuum to at least the unshrunken end of said glass tubing;
   (C) and progressively heating a limited section of said tubing to a fluid condition from one end of a portion of said tubing to be shrunk to the other end of said portion while maintaining the mandrel portion in the unshrunk portion of the tubing under tension while rotating said tubing and mandrel.

5. A method for making straight, precision glass barrels for syringes, comprising the steps of:
   (A) inserting a mandrel into the bore of a length of glass tubing and placing said mandrel under tension;
   (B) rotatably mounting said tubing and installed mandrel and rotating same;
   (C) applying vacuum to both ends of said tubing;
   (D) creating a heat zone and progressively heating a relatively small portion of said tubing and mandrel, while continuously rotating same, from a position adjacent one end to a position adjacent the other end while maintaining the portion of the mandrel ahead of the heated zone under tension;
   (E) supporting the tubing ahead of and adjacent to the heat zone as said zone progressively moves;
   (F) and supporting the tubing behind the heat zone, said supporting being adjacent the heat zone and moving along with same.

6. In a method for making straight, precision glass barrels for syringes, the steps of:
   (A) inserting a mandrel in the bore of a length of glass tubing and placing said mandrel under tension;
   (B) rotatably mounting said tubing and installed mandrel and rotating same;
   (C) applying vacuum to both ends of said tubing;
   (D) creating a heat zone and progressively heating a relatively small portion of said tubing and mandrel, while continuously rotating same, from a position adjacent one end to a position adjacent the other end while maintaining the portion of the mandrel ahead of the heated zone under tension;
   (E) supporting the tubing ahead of and adjacent to the heated zone as said zone progressively moves;
   (F) and supporting the tubing behind the heat zone, said supporting being provided behind the heated zone after it has progressed a substantial distance from its starting position.

7. In a method for making straight precision glass barrels and the like, the steps of:
   (A) rotating a length of glass tubing with a tensioned support in the bore of said tubing;
   (B) and heat softening a relatively small section of said rotating tubing progressively along said tubing from a starting position,
   (C) said tubing cooling straight as the result of the rotating thereof.

8. In a method for making straight, precision glass barrels for syringes and the like:
   (A) rotating a length of glass tubing with a mandrel disposed under tension in the bore thereof;
   (B) a heat softening said glass tubing while rotating and shrinking same on the tensioned mandrel,
   (C) precise straight bore tubing forming as a result of the rotating of said tubing.

9. In a method for making straight, precision glass barrels for syringes and the like:
   (A) rotating a length of glass tubing with a mandrel disposed under tension in the bore thereof;
   (B) and progressively heat softening a limited portion of said tubing while rotating and shrinking same on the mandrel along at least a portion of said tubing while said mandrel is under tension, said tubing cooling as the heat softening and shrinking progresses along said tubing,
   (C) said tubing cooling with the bore in a precise straight condition as a result of the rotating of the tubing.

10. In a method for making straight, precision glass barrels for syringes and the like:
   (A) positioning a mandrel in the bore of a length of glass tubing;
   (B) tensioning said mandrel;
   (C) operably supporting said mandrel and tubing when disposed on said mandrel;
   (D) and heat softening said tubing and shrinking same onto said mandrel while said mandrel is under tension.

11. In a method for making straight, precision glass barrels for syringes and the like:
   (A) operably supporting a length of glass tubing and a tensioned mandrel disposed in the bore of said tubing;
   (B) and heat softening said tubing and shrinking same onto said tensioned mandrel.

12. In a method for making straight, precision glass barrels for syringes and the like:
   (A) operably supporting a length of glass tubing and a mandrel under tension disposed in a bore of said tubing;
   (B) heat softening said tubing and shrinking same onto said mandrel while said mandrel is under tension;
   (C) and applying suction to at least the unshrunk portion of the bore of said tubing, as said tubing is softened and shrunk onto said mandrel.

13. In apparatus for shrinking glass tubing and making straight, precision glass barrels:
   (A) a mandrel for disposition within the bore of a length of glass tubing;
   (B) support means for operably supporting said mandrel and glass tubing when disposed on said mandrel;
   (C) yielding means for maintaining said mandrel under tension;
   (D) means for rotating said tubing and mandrel;
   (E) and means for heat softening said tubing and shrinking same to the mandrel progressively from a starting point.

14. In apparatus for shrinking glass tubing and making straight, precision glass barrels:
   (A) a mandrel for disposition within the bore of glass tubing;
   (B) rotatable support means for said mandrel and tubing when disposed on said mandrel;
   (C) means for tensioning said mandrel;
   (D) means for progressively heat softening a section of said glass tubing and shrinking same onto said mandrel;
   (E) and means for applying suction to the bore of said tubing in at least the unshrunk portion thereof while said tubing is softened and shrunk onto said mandrel.

15. In apparatus for shrinking glass tubing and making straight, precision glass barrels:
   (A) a mandrel for disposition within the bore of glass tubing;
   (B) support means for operably supporting said mandrel and tubing when disposed on said mandrel;
   (C) means for tensioning said mandrel;
   (D) and means for progressively heat softening a portion of said glass tubing and shrinking same to said mandrel.

16. In apparatus for shrinking glass tubing and making straight, precision glass barrels:
   (A) a mandrel for disposition within the bore of a length of glass tubing;
   (B) support means for operably supporting said tubing when disposed on said mandrel;
   (C) means for tensioning said mandrel;
   (D) and means for heat softening said tubing and shrinking same onto said mandrel.

References Cited by the Examiner

UNITED STATES PATENTS

| | | | |
|---|---|---|---|
| 658,088 | 9/1900 | Jones | 249—186 |
| 1,721,570 | 7/1929 | Millar | 65—271 |
| 2,371,881 | 3/1945 | Dichter | 65—271 |
| 3,091,104 | 5/1963 | Morrill | 65—110 X |
| 3,091,105 | 5/1963 | Morrill | 65—110 X |

DONALL H. SYLVESTER, *Primary Examiner.*

A. D. KELLOGG, *Assistant Examiner.*